United States Patent
Adams et al.

(10) Patent No.: US 6,922,897 B1
(45) Date of Patent: Aug. 2, 2005

(54) BALL CAGE

(75) Inventors: Franz-Josef Adams, Köln (DE); Angel Alvarez-Mendez, Stolberg (DE); Ralf Andreas Schellhaas, Köln (DE); Volker Steude, Köln (DE); Peter Josef Strötgen, Wülfrath (DE); Guido Kochsiek, Leopoldshöhe (DE)

(73) Assignee: IPROTEC Maschinen- und Edelstahlprodukte GmbH, (DE)

( * ) Notice: Subject to any disclaimer, the term of this patent is extended or adjusted under 35 U.S.C. 154(b) by 110 days.

(21) Appl. No.: 10/088,154

(22) PCT Filed: Sep. 13, 2000

(86) PCT No.: PCT/EP00/08926

§ 371 (c)(1),
(2), (4) Date: Jul. 16, 2002

(87) PCT Pub. No.: WO01/20185

PCT Pub. Date: Mar. 22, 2001

(30) Foreign Application Priority Data

Sep. 14, 1999 (EP) .................................. 99118232
Dec. 6, 1999 (DE) ................................ 199 58 719

(51) Int. Cl.$^7$ ............................................. F16L 3/224

(52) U.S. Cl. ............................. 29/898.067; 29/898.13; 464/145; 464/906

(58) Field of Search .............................. 464/145, 146, 464/906; 29/898.067, 898.13; 384/523–536

(56) References Cited

U.S. PATENT DOCUMENTS

| | | | | |
|---|---|---|---|---|
| 3,362,192 A | * | 1/1968 | Orain | 464/146 |
| 3,647,269 A | * | 3/1972 | McKee | 384/470 |
| 3,707,753 A | * | 1/1973 | Bailey, Jr. | 29/898.067 |
| 3,815,381 A | * | 6/1974 | Wagner | 464/146 |
| 3,935,717 A | * | 2/1976 | Welschof | 464/145 |
| 4,633,744 A | | 1/1987 | Maurer | |
| 5,410,902 A | * | 5/1995 | Jacob | 29/898.067 |
| 6,161,414 A | * | 12/2000 | Hainz | 29/898.067 |
| 6,234,908 B1 | * | 5/2001 | Jacob | 464/145 |
| 6,461,244 B2 | * | 10/2002 | Meyer et al. | 464/145 |
| 6,550,140 B1 | * | 4/2003 | Kochsiek | 29/898.067 |
| 6,557,257 B2 | * | 5/2003 | Johnson et al. | 29/898.066 |
| 6,665,936 B1 | * | 12/2003 | Kochsiek | 29/898.066 |

FOREIGN PATENT DOCUMENTS

| | | |
|---|---|---|
| EP | 0 927 832 A1 | 7/1997 |
| WO | 99/30052 | 6/1999 |

* cited by examiner

Primary Examiner—Aaron Dunwoody
(74) Attorney, Agent, or Firm—Cantor Colburn LLP

(57) ABSTRACT

Ball cage for homokinetic joints, formed from a blank that is configured as a substantially annular spherical segment, the ball cage includes: window-type ball pockets located along an equator with substantially equator-parallel bearing surfaces that interact with joint balls, with substantially annular functional zones that are designed at least on outer ring edge areas and that interact with a joint bell, and with substantially annular functional areas that are designed on inner ring areas and interact with the joint spider, wherein on the blank at least some of the functional zones are elevated compared to the neighboring areas of the ball cage.

15 Claims, 3 Drawing Sheets

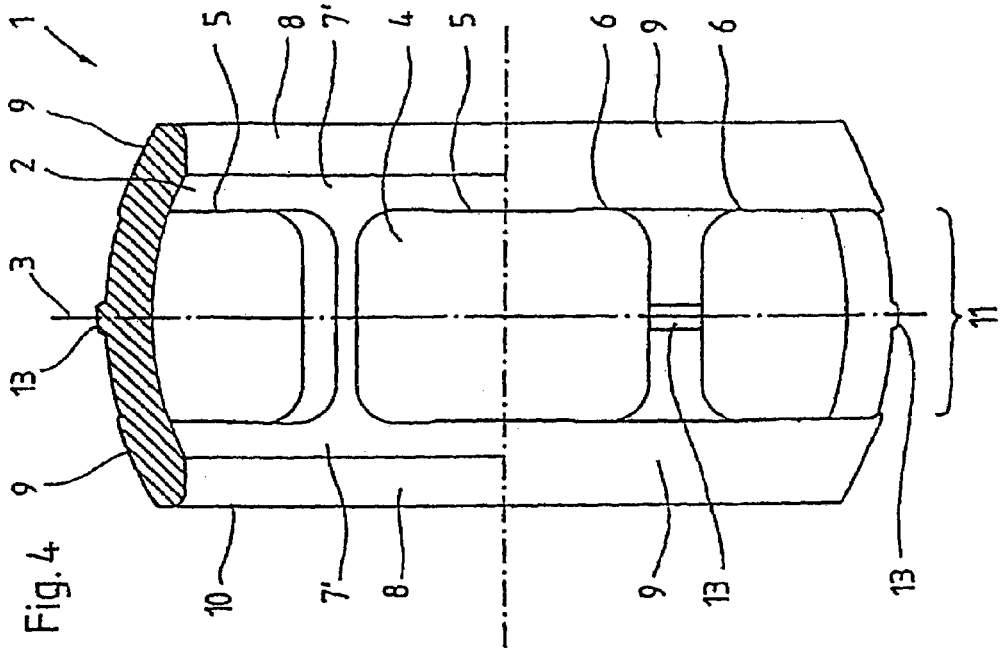
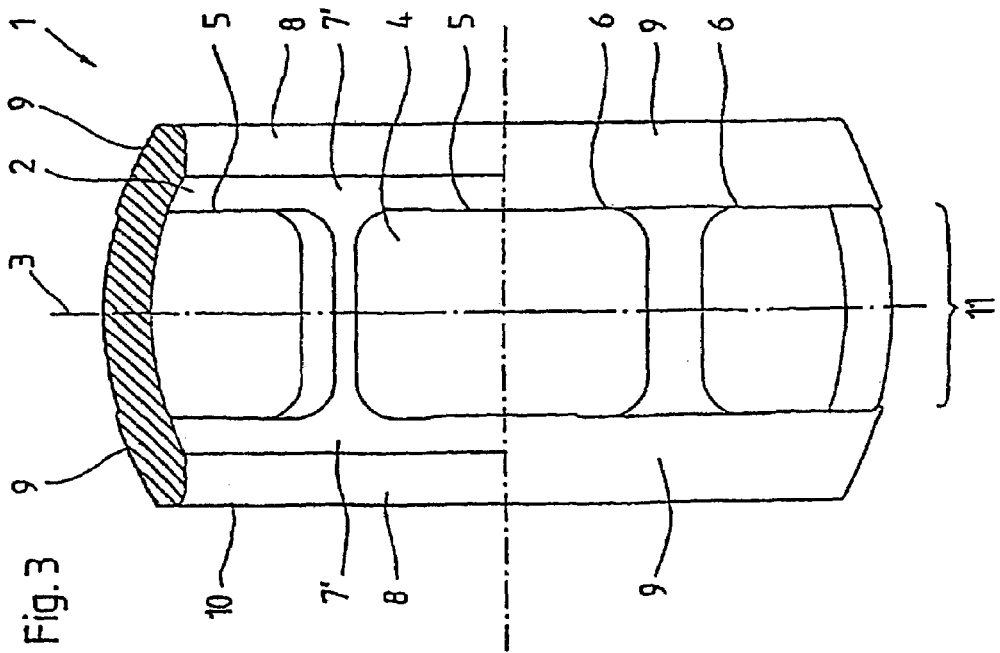

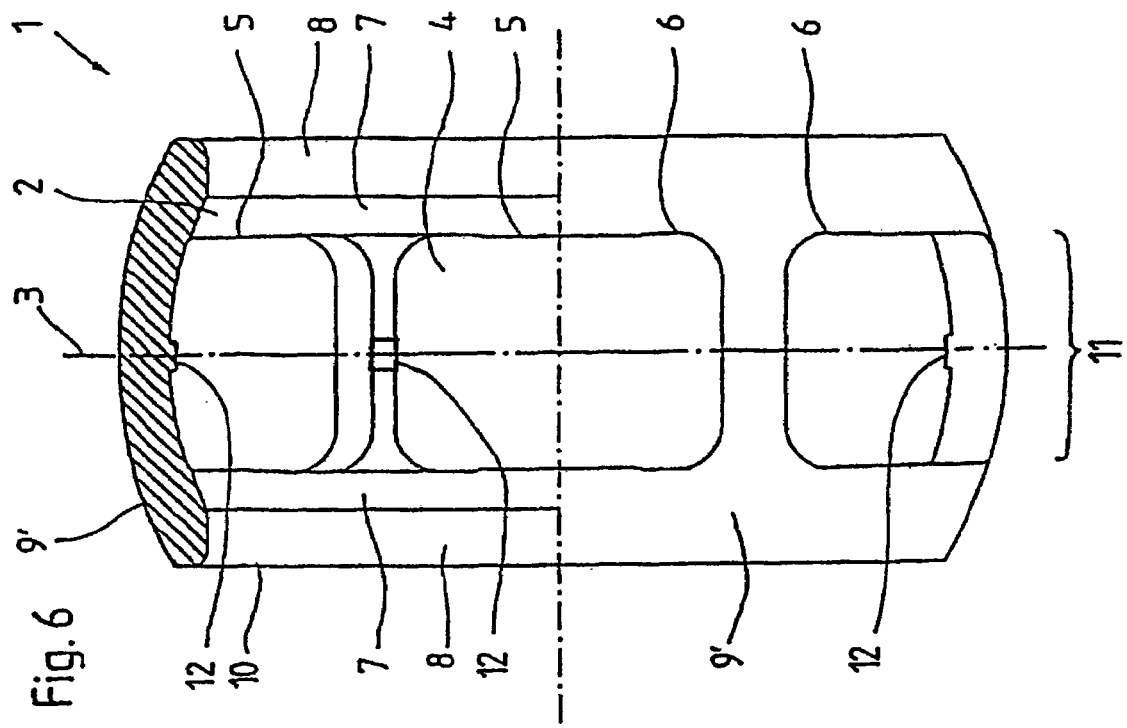
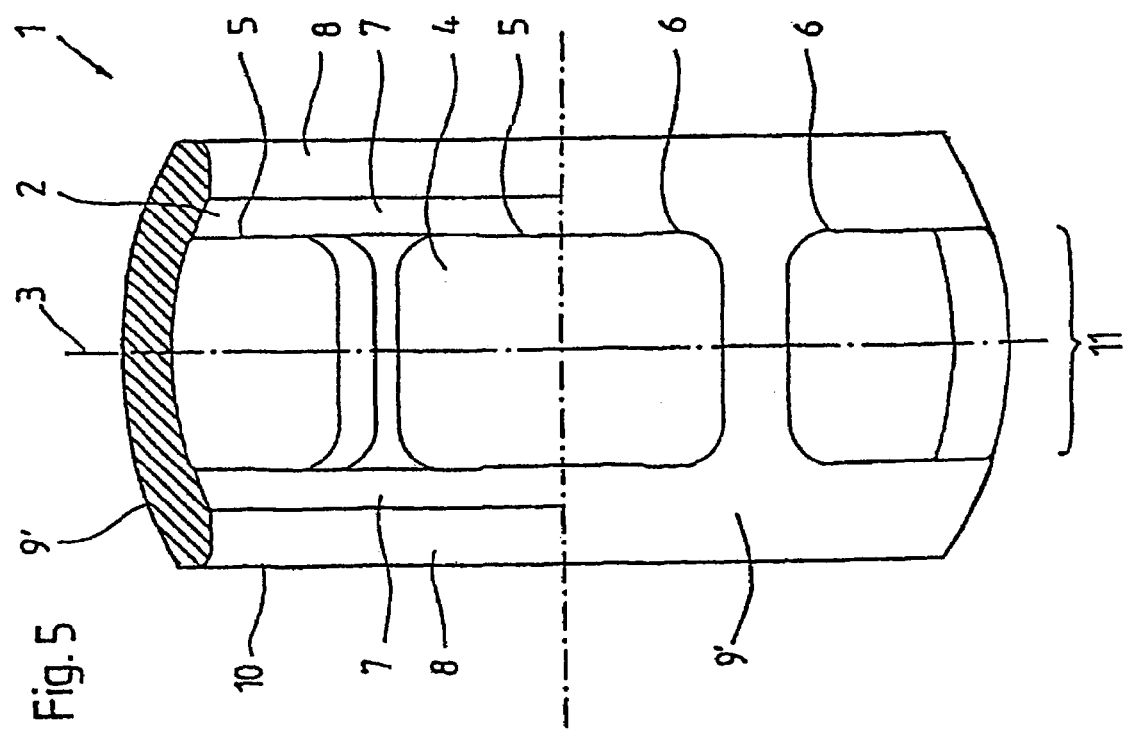

BALL CAGE

FIELD OF THE INVENTION

The present invention relates to a ball cage for homokinetic joints, formed from a blank that is configured as a substantially annular spherical segment, with window-type ball pockets located along the equator with substantially equator-parallel bearing surfaces that interact with the joint balls, with substantially annular functional zones that are located on the outer ring edges and interact with the joint bell, and with substantially annular functional surfaces that are located on the inner ring edges and interact with the joint spider.

DESCRIPTION OF THE RELATED ART

Ball cages form together with the so-called joint bell—also called axle journal—, the ball hub—also called the joint spider—as well as the balls the essential elements of a fixed joint. The elements ball cage axle journal and ball cage ball hub are paired with clearance fit, wherein the remaining finished part tolerances are within the range of just a few micrometers for functional reasons. Ball cages of the conventional design are characterized by a continuous shape of those surfaces of the component that are in contact with the axle journal to the outside and with the ball hub to the inside. Both the exterior contour as well as the interior contour, respectively, of the annular spherical segments are shaped as a radius, which extends from the one lateral periphery via the fin area to the opposite other periphery.

In motor vehicles with front-wheel drive, the steered wheels are driven. Therefore front wheel axle shafts must have joints, which permit both the compression and rebound of the wheels as well as their steering angle. In order to enable as uniform a drive of the wheels as possible, homokinetic joints are used. For joints on the front axle shaft, but also on the rear axles, among other things fixed homokinetic joints are designed as the joints, while for joints on the rear axle shaft shifting homokinetic joints are used, which apart from a flexion of the joint also permit axial displacement.

On the fixed homokinetic joint, ball cup and ball spider have arched paths on which the balls travel. On the shifting homokinetic joint, the travel paths on the ball cup and ball spider are plane. Such ball cages have an annular design and annual spherical segment shapes. The material of these spherically designed rings is several millimeters strong. The window-type ball pockets along the equator have functional zones, which interact with the joint balls, in the substantially equator-parallel edges. On the upper and lower outer ring areas, peripheral annular functional zones are formed, which serve the purpose of interaction between the ball cage and a joint bell. In the interior area, annular surfaces are designed above and beneath the window-type recesses as functional zones, which serve the purpose of interaction between the ball cage and the joint spider. The homokinetic joint should practically have no play so that the interacting areas of ball cage, joint bell and joint spider are subject to very tight tolerance settings In homokinetic joints that we know from practice, which consist of ball spider, ball cage and ball cup, the ball cages, which are equipped with annular interior and exterior bearing surfaces and ball pockets for seating the torque-transmitting balls, are produced in a variety of operations on various machines. Starting from a hollow tube, which has roughly the same outer diameter as the ball cage that is supposed to be manufactured, initially a section of the tube is separated from the starting tube in familiar production methods for the ball cage's blanks, with this section's width roughly corresponding to the width of the ball cage that is supposed to be manufactured. Subsequently, the annular inner and outer bearing surfaces are formed in a forging process, then turned and the ball pockets are stamped out of the annular bearing surfaces on another machine before these blanks reach the finishing process after hardening.

The disadvantage with these familiar manufacturing processes is on one hand the fact that the production of each ball cage comprises several operations that have to be performed on different machines and on the other hand the fact that in forging and stamping of the ball pockets structural disturbances and tensions are created in the material of the ball cage. Due to this multitude of operations on different machines, the production of these ball cages is time-intensive and expensive. We also know that a blank is hardened and machined to the tolerance dimension on all surfaces through appropriate processes, usually hard-turning. This creates very exact and smooth functional surfaces. Since fixed joints are generally designed so as to be able to transmit great forces also under flexion with an appropriate service life, the materials that are used are exclusively hardened steels. In order to be able to adhere to the tight manufacturing tolerances, finishing generally occurs on the hardened component. This occurs conventionally through a machining process with a geometrically undefined cutter, e.g. hard-turning or hard-milling.

A problem in the hard-finishing of ball cages that has not been resolved so far consists of the fact that due to the windows that are inserted on the circumference an interrupted cut is created in the area of the fins, while the tool operates in a continuous cut in the areas lateral to the fins. The stress due to the interrupted cut on one hand and the change in the stress type from continuous to interrupted on the other hand has an unfavorable effect on the tool life.

For the processing of the hardened steel, special machining elements must be used, which are generally of very high quality and cost-intensive.

Due to the interrupted cut, only comparatively low cutting speeds can be set since otherwise the cutters are exposed to increased wear all the way to breakage of the cutter. It has also been proven that the firmness of the ball cage that is supposed to be finished is subject to the notch effect and has a limited stability due to the surface machining process, which causes an uncontrolled interruption in the surface structure of the forging, i.e. a disturbance of the so-called fiber orientation.

Overall the manufacturing of ball cages of the described kind is very complex, scrap rates and tool requirements are relatively high and the finished ball cages are still very expensive despite intensive mass production.

SUMMARY OF THE INVENTION

Starting from the above-described state of the art, the present invention is based on the task of further developing a ball cage of the described kind in such a way that it can be manufactured with shorter machining times in a more economical and simple way.

For resolving this task from a technical point of view, the invention suggests to have at least some of the functional zones of the blank raised compared to the adjacent surfaces of the ball cage.

Due to the invented design of the blank's functional areas, which are elevated compared to the neighboring areas, there is now the possibility to limit finishing, preferably through hard-turning, to the functional areas or some functional areas. Consequently only a few areas are machined, the interrupted cut due to further processing of the fins remaining between the window-type recesses is eliminated and the elevation of the functional areas can be designed in such a way that the functional areas are still raised compared to the neighboring surfaces after the finishing process or at most are at the same level.

The ball cage is preferably rolled during manufacturing, i.e. shaped through rolling from one tubular piece. The window-type ball pockets are stamped pursuant to a beneficial suggestion of the invention, wherein the ball bearing surfaces, i.e. the equator-parallel surfaces, can be produced with an allowance. The particular advantage results during the turning of these surfaces since the path of the cutter tooth has a better course under better cutting conditions. This is especially true when only the bearing surface itself has an allowance, the ball pocket itself however is considerably longer so that on both sides free space that does not have to be finished remains. Through the rolling process, no notch forces are exercised on the blank, which results in a homogenous fiber orientation of the material so that overall greater stability is achieved, which leads to a longer life.

Overall, the allowance on the hardened functional areas, which are supposed to be machined through a turning process, considerably reduces the machining time since the turning speeds of the work piece can be increased drastically, e.g. doubled. Due to the fact that an interrupted cut is largely avoidable, the machining time can be shortened through higher speeds, and possible problems for the machining tools are cut to a minimum.

BRIEF DESCRIPTION OF THE DRAWINGS

Further benefits and features of the invention result from the following description based on the figures. They show:

FIG. 3 a semi-cut side view of an alternative embodiment of a ball cage;

FIG. 4 a semi-cut side view of an alternative embodiment of a ball cage;

FIG. 5 a semi-cut side view of an alternative embodiment of a ball cage;

FIG. 6 a semi-cut side view of an alternative embodiment of a ball cage.

DETAILED DESCRIPTION

Figure 1:
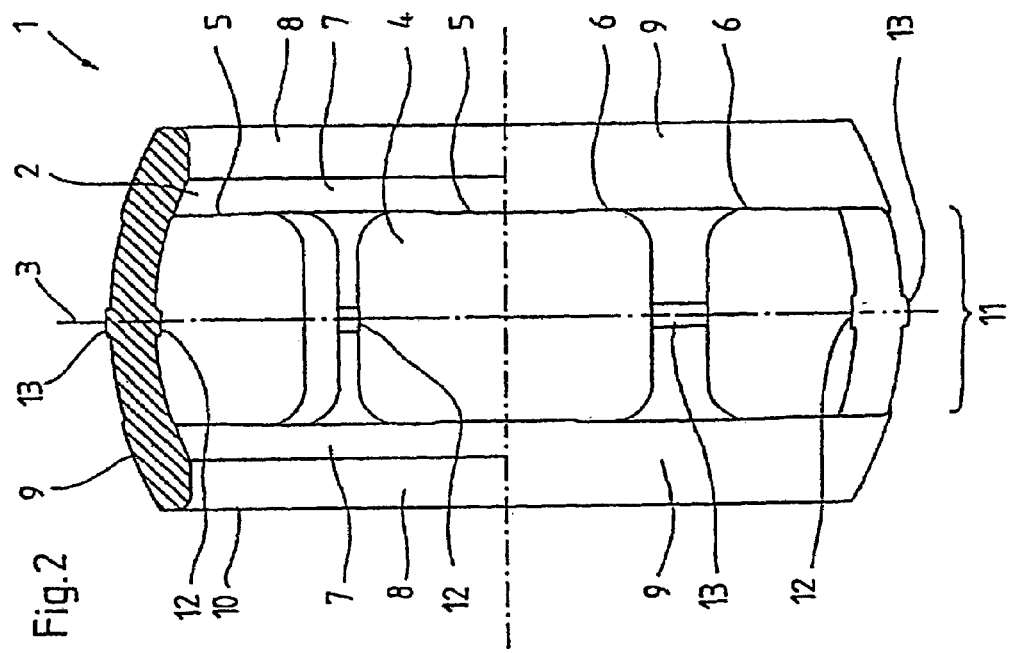
FIG. 1 a semi-cut side view of an embodiment of a ball cage.

The ball cage 1 shown in FIG. 1 consists of an annular spherical segment 2. Along the equator, shown by the center line 3, ball pockets 4 are designed, which contain ball bearing surfaces 5. The ball bearing surfaces 5 only take up a portion of the substantially equator-parallel edge 6 of the ball pocket so that free space is created on both sides. Annular functional zones 7 for the process with the joint spider and 9 for the interaction with the joint bell are incorporated in the ring interior or ring exterior. As the figure shows, all functional zones have an allowance, i.e. the areas 7 and 9. Also the ball bearing surfaces 5 have an allowance. Upon production of the blank through a rolling process and the incorporation of the ball pockets, for example through a stamping process, the blank is hardened. Subsequently, the functional zones that have an allowance are processed in a turning process and brought to the finished dimension. Only the surfaces 5, 7 and 9 must be processed. The reference or working surfaces such as the annular area 8 or a plane reference edge 10 are manufactured accordingly during the turning process.

This shows that on the entire area 11 no processing at all has to take place, thus avoiding any interrupted cuts. By incorporating the allowance, the functional zones can be processed pursuant to the tolerance requirements and are even after completion either still elevated compared to the remaining surfaces or at the most on the same level.

The invented design of the blank, according to which the entire area 11 can remain unprocessed since no functional surfaces must be incorporated there, causes a considerable reduction in machining time and a simplification of the manufacturing process.

Figure 2:
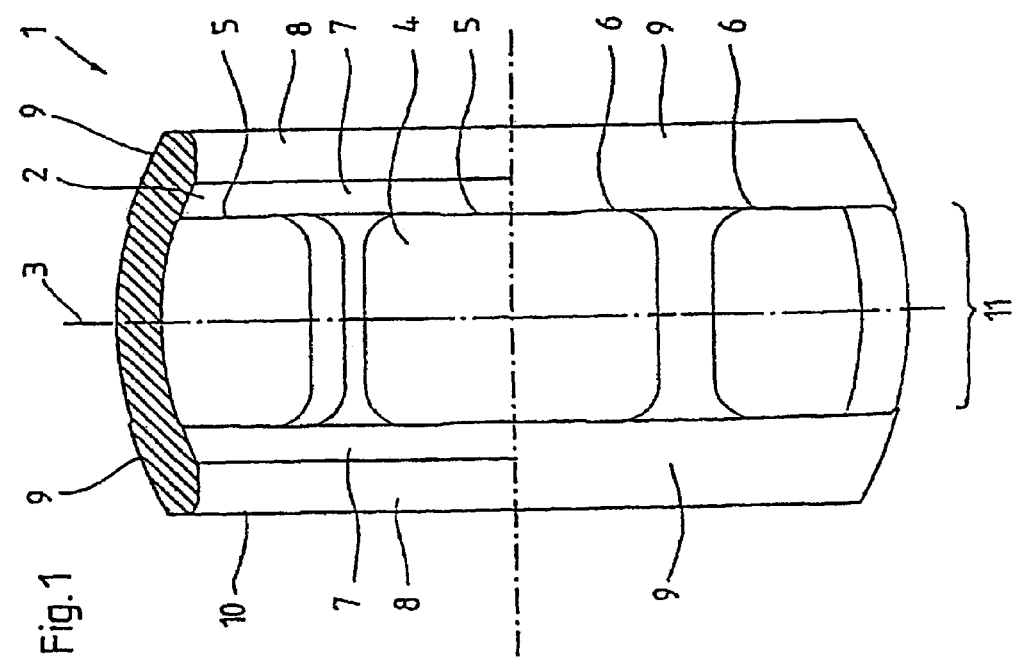
FIG. 2 a semi-cut side view of an alternative embodiment of a ball cage.

FIG. 2 shows a ball cage like in FIG. 1, except that in the fin area 11 additionally at least one support surface outside 13 and at least one support surface inside 12 are provided, which also have to be processed.

FIG. 3 shows a ball cage like in FIG. 1, except that only the outer annular functional areas 9 are elevated, while the inner functional area 7 is not elevated.

FIG. 4 shows a ball cage like in FIG. 3, except that in the fin area 11 additionally at least one support surface outside 13 is provided, which also has to be processed.

FIG. 5 shows a ball cage like in FIG. 1, except that only the inner annular functional areas 7 are elevated, while the outer functional area 9 is not elevated.

FIG. 6 shows a ball cage like in FIG. 5, except that in the fin area 11 additionally at least one support surface inside 12 is provided, which also has to be processed.

The described embodiment serves the purpose of explanation and does not have a limiting effect.

REFERENCE LIST 1 ball cage
2 annular spherical segment
3 equator
4 ball pocket
5 bearing surface
6 equator-parallel edge
7 annular functional zone
7' annular functional zone
8 reference/working surface
9 annular functional zone
9' annular functional zone
10 reference/working surface
11 unfinished area
12 support area inside
13 support area outside

What is claimed is:

1. A method of producing a ball cage, the method comprising:
    providing a ball cage having a functional area that is elevated as compared to an adjacent surface of the ball cage blank;
    machining the functional area of the ball cage blank with an uninterrupted cut; and
    hardening the ball cage blank before the machining of the functional area, wherein the machining is hard-turning.

2. The method pursuant to claim 1, wherein, after the machining, the functional area is elevated as compared to the adjacent surface.

3. The method pursuant to claim 1, further comprising stamping window-type ball pockets.

4. The method pursuant to claim 1, forming the ball cage blank by a rolling process.

5. The method pursuant to claim 1, wherein, after the machining, the functional area is a sense level as compared to the adjacent surface.

6. A method for producing a ball cage, the method comprising:

provided a ball cage blank having a functional area that is elevated as compared to an adjacent surface of the ball cage blank;

machining the functional area of the ball cage blank with an uninterrupted cut, wherein, after the machining, the functional area is a same level as compared to the adjacent surface.

7. The method pursuant to claim 6, further comprising stamping ball pockets.

8. The method pursuant to claim 6, forming the ball cage blank by a rolling process.

9. The method pursuant to claim 6, wherein the machining is hard-turning.

10. The method pursuant to claim 6, wherein, after the machining, the functional area is elevated as compared to a second adjacent surface.

11. A method for producing a ball cage, the method comprising:

providing a ball cage blank having a functional area that is elevated as compared to an adjacent surface of the ball cage blank;

machining the ball cage blank with an uninterrupted cut; and forming the ball cage blank by a rolling process.

12. The method pursuant to claim 11, further comprising stamping ball pockets.

13. The method pursuant to claim 11, wherein the machining is hard-turning.

14. The method pursuant to claim 11, wherein, after the machining, the functional area is a same level as compared to the adjacent surface.

15. The method pursuant to claim 11, wherein, after the machining, the functional area is elevated as compared to the adjacent surface.

* * * * *